US006944924B2

(12) United States Patent
Hayes

(10) Patent No.: US 6,944,924 B2
(45) Date of Patent: Sep. 20, 2005

(54) VALVE STEM PULLER AND VALVE STEM CORE TOOL

(76) Inventor: Robert J. Hayes, 8311 County Rd. 208, St. Augustine, FL (US) 32092

( * ) Notice: Subject to any disclaimer, the term of this patent is extended or adjusted under 35 U.S.C. 154(b) by 111 days.

(21) Appl. No.: 10/619,211

(22) Filed: Jul. 15, 2003

(65) Prior Publication Data

US 2005/0011062 A1 Jan. 20, 2005

(51) Int. Cl.[7] .................... B23P 19/04
(52) U.S. Cl. .................... 29/221.5
(58) Field of Search .................... 29/221.5

(56) References Cited

U.S. PATENT DOCUMENTS

| | | | |
|---|---|---|---|
| 1,308,219 | A | 7/1919 | Brucker |
| 2,397,334 | A | 3/1946 | Broecker |
| 2,415,063 | A | 1/1947 | Hosking |
| 2,424,802 | A | 7/1947 | Crowley |
| 2,475,451 | A | 7/1949 | Gouirand |
| 2,709,383 | A | 5/1955 | Davies |
| 2,772,714 | A | 12/1956 | Hosking |
| 2,943,665 | A | 7/1960 | Cincel |
| 3,100,335 | A | 8/1963 | Lea |
| 3,154,128 | A | 10/1964 | Keefe |
| 2002/0170157 | A1 | 11/2002 | Detzel |

OTHER PUBLICATIONS

Sarweshwari Engineers—Title: Tyre Valve Tools May 19, 2003.
Sarweshwari Engineers—Title: Cable Type Valve Finishing Tool May 22, 2003.
Any Patent Lawyers Here? May 19, 2003 "Let's Roll".

*Primary Examiner*—Robert C. Watson
(74) *Attorney, Agent, or Firm*—Arthur G. Yeager

(57) ABSTRACT

A tool for pulling a valve stem and removing the valve core of a Schrader-type pneumatic valve includes an elongate flexible shaft having opposite end portions and a handle affixed to one end portion and a valve-core engaging member including a threaded rear portion and an unthreaded forked front portion for cooperating with a flat member of a Schrader-type valve core for rotating the core to remove it from the valve. The threaded rear portion is threadable into interior threads of the valve when the core has been removed for allowing a user of the tool to pull the valve through a wheel rim opening. The front forked portion of the valve-core engaging member includes a recess formed therein for accommodating a plunger of a Schrader-type valve therein to allow the forked portion to be positioned over the plunger in the valve to provide for engagement of the cooperating forked portion of the valve core.

20 Claims, 2 Drawing Sheets

VALVE STEM PULLER AND VALVE STEM CORE TOOL

CROSS REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a tool for pulling a valve stem through an opening in a tire rim, and particularly to tools for use with Schrader-type pneumatic tire valve stems.

2. Relevant Art

A wide variety of tools exist for use with tire valves. What is needed is a tool specifically for use in pulling a valve stem of an inner tube or tire through an opening in a wheel rim. The tool should fit inside the valve stem, and therefore be usable as a tool for valve stem removal and installation particularly for Schrader-type pneumatic tire valves.

BRIEF SUMMARY OF THE INVENTION

In one aspect of the present invention there is provided a tool for pulling a valve stem and removing the valve core of a Schrader-type pneumatic valve comprising an elongate flexible shaft having opposite end portions and a handle affixed to one end portion and a valve-core engaging member attached to another end portion, the valve-core engaging member including a threaded rear portion and an unthreaded forked front portion for cooperating with a flat member of a Schrader-type valve core for rotating such core to remove it from such valve. The threaded rear portion is threadable into interior threads of such valve when such core has been removed for allowing a user of the tool to pull such valve through a wheel rim opening. There is also included a swivel fitting for rotatably mounting said valve-core engaging member to said shaft. The swivel fitting has an irregular outer surface to facilitate grasping and rotation of it by a user. The front forked portion of the valve-core engaging member includes a recess formed therein for accommodating a plunger of a Schrader-type valve therein to allow the forked portion to be positioned over such plunger in such valve to provide for engagement of such cooperating flat portion of such valve core.

The tool elongate shaft includes a flexible cable member and the threaded rear portion is rigidly attached to the swivel fitting.

In another aspect of the invention there is provided a tool for engaging a valve stem of a Schrader-type pneumatic valve having a valve core removed comprising an elongate flexible shaft having opposite end portions and a handle affixed to one end portion and a valve stem engaging member attached to another end portion. The valve stem engaging member including a threaded rear portion and an unthreaded front portion, with the threaded rear portion being threadable into interior threads of such valve when such core has been removed for allowing a user of the tool to pull such valve stem through a wheel rim opening. A swivel fitting for rotatably mounting the valve stem member to the shaft is included. The elongate shaft includes a flexible cable member. The threaded rear portion is rigidly attached to the swivel fitting.

The unthreaded front portion of the valve stem engaging member is sized to fit into a space in such valve formed by the removal of a valve core from such valve to provide for engagement of the threaded rear portion of the valve stem engaging member with interior threads of such valve stem. The front portion of the valve-stem engaging member includes a pair of tines for engagement with a valve core of a Schrader-type pneumatic tire valve for removing such valve core from such valve. The front portion of the valve stem engaging member includes a recess formed therein to accommodate an upper portion of a plunger of a Schrader-type pneumatic tire valve during removal of a valve core from such valve.

In another aspect of the present invention there is provided a tool for pulling a valve stem of a pneumatic tire valve comprising an elongate flexible cable member having opposite end portions and a handle affixed to one end portion and a valve-stem engaging member attached to another end portion, the valve stem engaging member including a threaded rear portion and an unthreaded front portion. The threaded rear portion is threadable into interior threads of a valve stem when such core has been removed for allowing a user of the tool to pull such valve stem through a wheel rim opening.

A swivel fitting is provided for rotatably mounting the valve stem engaging member to the cable member. The front forked portion of the valve stem engaging member is sized to fit within the space in a valve stem when a valve core has been removed from such valve stem. The threaded rear portion is rigidly attached to the swivel fitting. The front portion of the valve stem engaging member includes a pair of spaced tines for engagement with a valve core of Schrader-type pneumatic tire valve for removing such valve core from such valve. The front portion of the valve stem engaging member includes a recess formed therein to accommodate an upper portion of a plunger of a Schrader-type pneumatic tire valve during removal of a valve core from such valve. The recess is formed between the tines.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by references to the following description taken in connection with the accompanying drawings, in which:

DETAILED DESCRIPTION OF THE INVENTION

Introduction

The present invention is designed to make the process of guiding the valve stem through the wheel rim valve opening simpler and faster than by manual positioning of the valve stem in the wheel rim valve opening. The tool also incorporates a valve core tool for the removal and installation of the valve core in Schrader-type pneumatic tire valve stems in the design. This allows the tool to be used to remove and install the valve stem core in addition to the primary use of the tool. Both the removal and installation of the valve stem core can often be required during the mounting process for tube type pneumatic tires. This combination of the utility of the valve core tool and the ability of the tool to quickly and easily position a valve stem into a wheel rim valve-opening make the tool even more unique.

Figure 1:
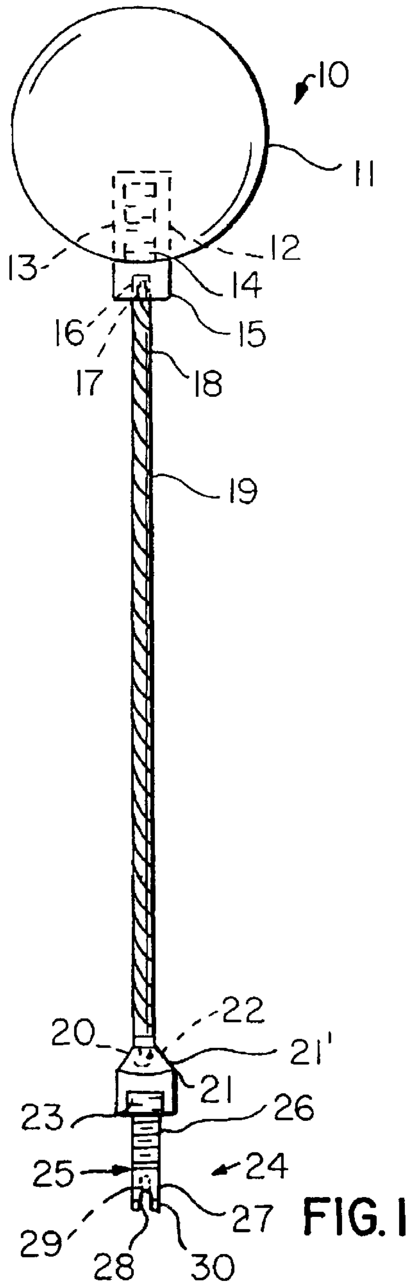
FIG. 1 is a perspective view of the valve stem puller and valve stem core tool in accord with the present invention.

The valve stem puller and valve stem core tool is illustrated at numeral 10 in FIG. 1. A handle in the form of a knob 11 has a recess 12 formed therein to receive a threaded insert 13. The insert 13 includes interior threads 14 into which threaded plug 15 is installed. The plug 15 includes a recess 16 into which stainless steel cable 18 is rigidly attached via swaged end 17.

An elongate flexible shaft in the form of a multi-ply cable 18 is preferably covered with a vinyl sheath 19 and has a swaged ball plug 20 for mounting the cable 18 in swivel fitting 21 having an irregular outer surface to facilitate grasping via recess 22. A threaded recess 23 carries the valve core tool shown generally at 24. Taper portion, 21' assists in guiding the fitting 24 through an opening 36.

The tool 24 includes a two-part rod member 25 with a threaded portion 26 for mounting in recess 23 and a non-threaded portion 27 having a machined slot 28 therein forming a pair of tines 40 and a gun-drilled recess 29 at the end 30 thereof.

Figure 2:
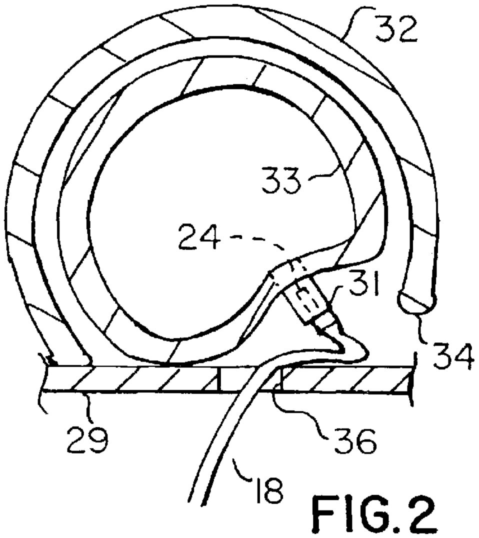
FIG. 2 is a cross-sectional perspective view of the tool of FIG. 1 in use in installing a valve stem in an inner tube in a pneumatic tire.
Figure 3:
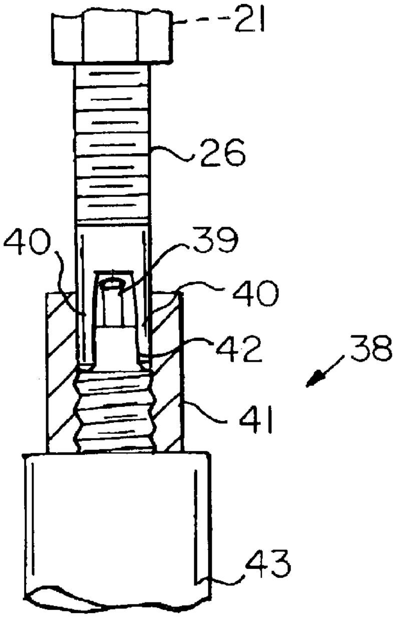
FIG. 3 is an enlarged partial cross-sectional, view of the tool of FIG. 1 threaded into a Schrader-type pneumatic tire valve stem.
Figure 4:
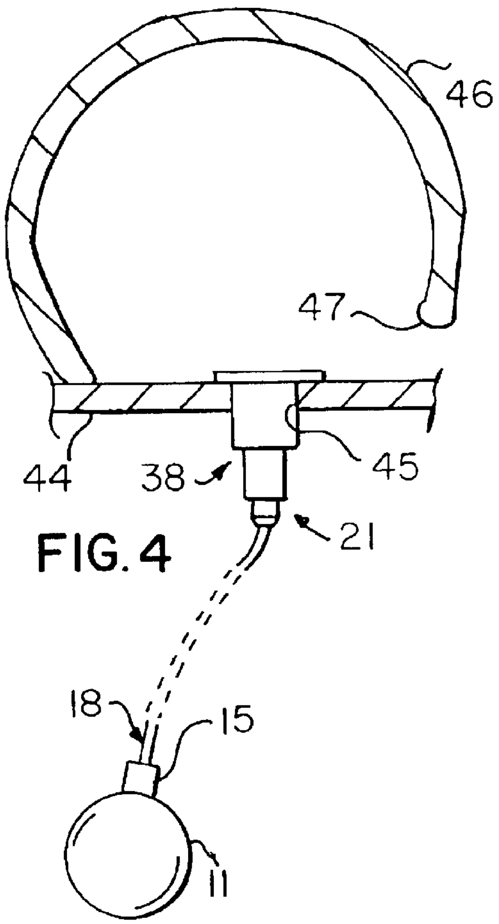
FIG. 4 is a cross-sectional perspective view of the tool of FIG. 1 in use in installing a valve stem in a rim carrying a tubeless pneumatic tire.

With respect to FIG. 2, a valve stem 31 provides for air into and out of tube 33 in tire 32 that has a conventional bead 34 for mounting on rim 35 having a valve opening 36.

To use the device 10 to position a tube type valve stem 31 while mounting a tube type pneumatic tire 32, the fitting 21 is inserted through the wheel rim valve opening 36 from the outside of the rim 35 prior to installation of the tube 33 into the partially mounted tire 32. at this point in the tire mounting process only one side of the tire 32 will have been mounted onto the wheel rim 35. After inserting the fitting 21 through the opening 36 and retrieving it from the inside of the rim 35 the threaded portion 26 of the fitting 21 is threaded into the valve stem 31 of the tube 33 being installed into the tire 32. The tube valve stem will have had the valve core 37 removed either with the valve core tool 24 incorporated into this tool or with another valve core tool. Once the tool is secured into the valve stem 31, the tube 33 is installed into the tire 32 by pulling the knob 11 on the other end of the device 10. The valve stem 31 is guided through the wheel rim valve opening 36. The tool 24 is then unthreaded and removed from the valve stem 31 and the valve stem core 37 is reinstalled into the valve stem 31 either with the valve core tool incorporated into this tool 24 or with another valve core tool. The second side of the tire 32 would then be mounted to complete the process of mounting the tire 32 to the wheel rim 35.

The device 10 can also be used to install tubeless type tire valve stems 38 into tubeless type wheel rims 44 by inserting the end of the assembly with the fitting 21 through the wheel rim valve opening 45 from the outside of the rim 44 prior to installation of the tire 46 having bead 47 onto the wheel rim 44. After inserting the fitting 21 through the opening 45 and retrieving it from the inside of the rim 44, the threaded portion 26 of the fitting 21 is threaded into the valve stem 38 being installed into the wheel rim 44. The valve stem 38 will have had the valve core 41 removed either with the valve core tool incorporated into this tool 24 or with another valve core tool. Once the tool 24 is secured into the valve stem 38 it is installed into the wheel rim 44 by pulling the knob 11 on the other end of the tool 24 guiding the valve stem 38 through the wheel rim valve opening 45. The tool is then unthreaded and removed from the valve stem 38 and the valve stem core 41 is reinstalled into the valve stem 38 either with the valve core tool 24 incorporated in device 10 or with another valve core tool.

Valve plunger 39 fits within the recess 29 when the tool 24 is used.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A tool for pulling a valve stem and removing the valve core of a Schrader-type pneumatic valve comprising an elongate flexible shaft having opposite end portions and a handle affixed to one said end portion and a valve-core engaging member attached to another said end portion, said valve-core engaging member including a threaded rear portion and an unthreaded forked front portion for cooperating with a forked member of a Schrader-type valve core for rotating such core to remove it from such valve, said threaded rear portion being externally threaded for threading into interior threads of such valve when such core has been removed for allowing a user of said tool to pull such valve through a wheel rim opening.

2. The tool as defined in claim 1 further including a swivel fitting for the rotatably mounting said valve-core engaging member to said shaft.

3. The tool as defined in claim 1 wherein said swivel fitting is hexagonal in shape to facilitate grasping and rotation of said fitting by a user.

4. The tool as defined in claim 1 wherein said front forked portion of said valve-core engaging member includes a recess formed therein for accommodating a plunger of a Schrader-type valve therein to allow said forked portion to be positioned over such plunger in such valve to provide for engagement of such cooperating forked portion of such valve core.

5. The tool as defined in claim 1 wherein said elongate shaft includes a flexible cable member.

6. The tool as defined in claim 2 wherein said threaded rear portion is rigidly attached to said swivel fitting.

7. A tool for engaging a valve stem of a Schrader-type pneumatic valve having a valve core removed comprising an elongate flexible shaft having opposite end portions and a handle affixed to one said end portion and a valve stem engaging member attached to another said end portion, said valve stem engaging member including an externally threaded rear portion and an unthreaded front portion, said threaded rear portion being threadable into interior threads of such valve when such core has been removed for allowing a user of said tool to pull such valve stem through a wheel rim opening.

8. The tool as defined in claim 7 further including a swivel fitting for valve stem engaging rotatably mounting said member to said shaft.

9. The tool as defined in claim 7 wherein said elongate shaft includes a flexible cable member.

10. The tool as defined in claim 8 wherein said threaded rear portion is rigidly attached to said swivel fitting.

11. The tool as defined in claim 7 wherein said unthreaded front portion of said valve stem engaging member is sized to fit into a space in such valve formed by the removal of a valve core from such valve to provide for engagement of said threaded rear portion of said valve stem engaging member with interior threads of such valve stem.

12. The tool as defined in claim 7 wherein said front portion of said valve-stem engaging member includes a pair of tines for engagement with a valve core of a Schrader-type pneumatic tire valve for removing such valve core from such valve.

13. The tool as defined in claim 7 wherein said front portion of said valve stem engaging member includes a recess formed therein to accommodate an upper portion of a plunger of a Schrader-type pneumatic tire valve during removal of a valve core from such valve.

14. A tool for pulling a valve stem of a pneumatic tire valve comprising an elongate flexible cable member having opposite end portions and a handle affixed to one said end portion and a valve-stem engaging member attached to another said end portion, said valve stem engaging member including an externally threaded rear portion and an unthreaded front portion, said threaded rear portion being threadable into interior threads of a valve stem when such core has been removed for allowing a user of said tool to pull such valve stem through a wheel rim opening.

15. The tool as defined in claim 14 further including a swivel fitting for rotatably mounting said valve stem engaging member to said cable member.

16. The tool as defined in claim 14 wherein said front forked portion of said valve stem engaging member is sized to fit within the space in a valve stem when a valve core has been removed from such valve stem.

17. The tool as defined in claim 15 wherein said threaded rear portion is rigidly attached to said swivel fitting.

18. The tool as defined in claim 14 wherein said front portion of said valve stem engaging member includes a pair of spaced tines for engagement with a valve core of Schrader-type pneumatic tire valve for removing such valve core from such valve.

19. The tool as defined in claim 18 wherein said front portion of said valve stem engaging member includes a recess formed therein to accommodate an upper portion of a plunger of a Schrader-type pneumatic tire valve during removal of a valve core from such valve.

20. The tool as defined in claim 19 wherein said recess is formed between said tines.

* * * * *